United States Patent
Lefedjiev et al.

(10) Patent No.: US 9,847,732 B2
(45) Date of Patent: *Dec. 19, 2017

(54) SYNCHRONOUS RECTIFICATION

(71) Applicant: Power Integrations, Inc., San Jose, CA (US)

(72) Inventors: Adrian Lefedjiev, Gamlingay (GB); Toine Werner, Cambridge (GB)

(73) Assignee: Power Integrations, Inc., San Jose, CA (US)

(*) Notice: Subject to any disclaimer, the term of this patent is extended or adjusted under 35 U.S.C. 154(b) by 15 days.

This patent is subject to a terminal disclaimer.

(21) Appl. No.: 15/061,192

(22) Filed: Mar. 4, 2016

(65) Prior Publication Data

US 2016/0190949 A1     Jun. 30, 2016

Related U.S. Application Data (63) Continuation of application No. 14/290,621, filed on May 29, 2014, now Pat. No. 9,312,777.

(51) Int. Cl.
*H02M 3/335* (2006.01)
*H02M 1/36* (2007.01)

(52) U.S. Cl.
CPC ......... *H02M 3/33592* (2013.01); *H02M 1/36* (2013.01); *H02M 3/33523* (2013.01); *Y02B 70/1475* (2013.01)

(58) Field of Classification Search
CPC ......... H02M 3/33576; H02M 3/33592; H02M 3/335; H02M 1/36; H02M 3/33523
See application file for complete search history.

(56) References Cited

U.S. PATENT DOCUMENTS

| | | | |
|---|---|---|---|
| 2010/0027298 A1* | 2/2010 | Cohen | H02M 3/33592 363/21.14 |
| 2011/0006706 A1* | 1/2011 | Zhang | H02M 3/158 315/307 |

(Continued)

OTHER PUBLICATIONS

International Patent Application No. PCT/EP2015/061945—PCT International Search Report & Written Opinion, dated Dec. 10, 2015, 13 pages.

(Continued)

*Primary Examiner* — Adolf Berhane
*Assistant Examiner* — Sisay G Tiku
(74) *Attorney, Agent, or Firm* — Christensen O'Connor; Johnson Kindness PLLC (57) ABSTRACT

A controller for a use with a power converter includes a sensor coupled to sense a signal on a secondary side of the power converter. The sensor is coupled to detect a turn off of a power switch on a primary side of the power converter. A charge source is coupled to charge a control terminal of a synchronous rectifier on the secondary side of the power converter in response to said detection of the turn off of the power switch to a voltage beyond a threshold voltage of the synchronous rectifier to allow the synchronous rectifier to conduct a current of the secondary winding. A linear amplifier having an output is coupled to sink current from the control terminal of the synchronous rectifier in response to a difference between a voltage across the synchronous rectifier and an amplifier reference value.

33 Claims, 9 Drawing Sheets

(56) References Cited

U.S. PATENT DOCUMENTS

| | | | | |
|---|---|---|---|---|
| 2014/0112027 A1* | 4/2014 | Tseng | ................ | H02M 3/33592 |
| | | | | 363/21.05 |
| 2014/0112031 A1* | 4/2014 | Chen | ................ | H02M 3/33592 |
| | | | | 363/21.14 |
| 2014/0268915 A1* | 9/2014 | Kong | ................ | H02M 3/33592 |
| | | | | 363/21.14 |
| 2015/0124494 A1* | 5/2015 | Malinin | ............ | H02M 3/33592 |
| | | | | 363/21.14 |
| 2015/0349652 A1* | 12/2015 | Lefedjiev | .......... | H02M 3/33523 |
| | | | | 363/21.14 |

OTHER PUBLICATIONS

Janssen, "GreenChip SR: Synchronous Rectifier Controller IC", 2007 IEEE International Symposium on Industrial Electronics, Jun. 4-7, 2007, Vigo, Spain, © 2007 IEEE, pp. 2319-2325.
"AN10580: GreenChip TEA1761 synchronous rectification and feedback controller", Rev. 01, 19 Mar. 19, 2008, Application Note, NXP Semiconductors, © NXP B.V. 2008, 11 pages.
"TEA1761T: GreenChip synchronous rectifier controller", Product Data Sheet, Rev. 02, Apr. 25, 2007, © NXP B.V. 2007, 13 pages.
International Patent Application No. PCT/EP2015/061945—International Preliminary Report on Patentability dated Dec. 8, 2016, 10 pages.

* cited by examiner

SYNCHRONOUS RECTIFICATION

CROSS-REFERENCE TO RELATED APPLICATIONS

This application is a continuation of U.S. patent application Ser. No. 14/290,621, filed on May 29, 2014, now pending. U.S. patent application Ser. No. 14/290,621 is hereby incorporated by reference.

FIELD OF THE INVENTION

This invention generally relates to synchronous rectifier controllers for a switched mode power supply (SMPS) comprising a synchronous rectifier, SMPSs—in particular flyback switched mode power converters operating in discontinuous current mode and using primary side sensing—and methods for controlling a synchronous rectifier of an SMPS.

BACKGROUND TO THE INVENTION

In a switch mode power supply (SMPS), broadly speaking, a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly as power is drawn by the load on the output side.

An SMPS may operate in either a discontinuous conduction mode (DCM) or in continuous conduction mode (CCM) or at the boundary of the two in a critical conduction mode. In this specification we are generally concerned with DCM operating modes in which, when the switching device is turned off, the current on the secondary side of the transformer steadily, but gradually, declines until a point is reached at which substantially zero output current flows. In some topologies of conventional SMPS, the inductor or transformer may begin to ring during a so-called idle phase or pause. The period of the ringing is determined by the inductance and parasitic capacitance of the circuit.

Figure 9:
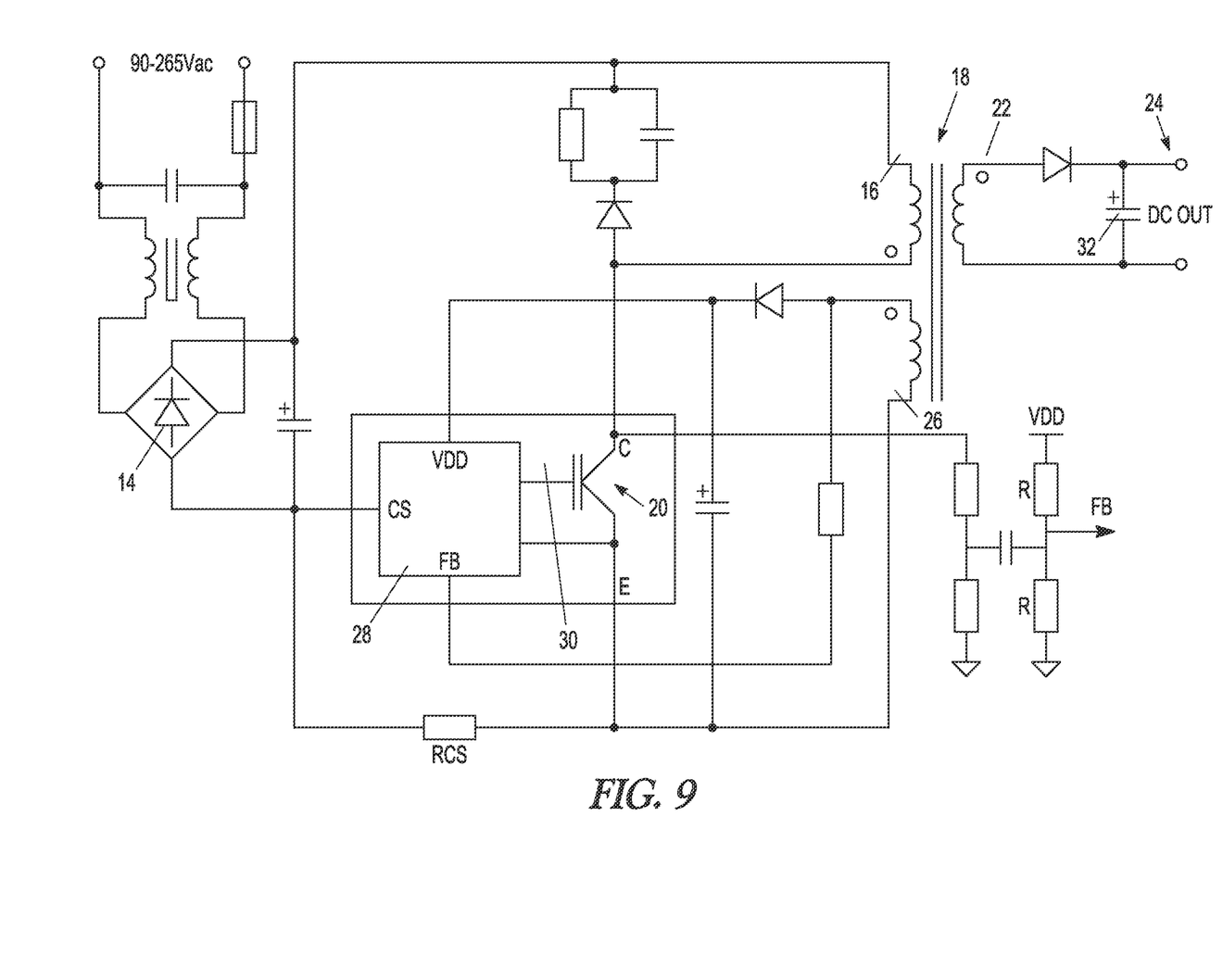
FIG. 9 shows an example of a SMPS circuit with primary side sensing.

Referring now to FIG. 9, this shows an example of a SMPS circuit with primary side sensing. The power supply comprises an AC mains input coupled to a bridge rectifier 14 to provide a DC supply to the input side of the power supply. This DC supply is switched across a primary winding 16 of a transformer 18 by means of a primary switch (power switch) 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportionally to the voltage on secondary winding 22. This feedback signal provides an input to a primary side sensing controller 28, powered by the input voltage, e.g., VDD. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit. As can be seen, the primary side controlled SMPS of FIG. 9 derives feedback information from the primary side of the transformer, using an auxiliary winding to avoid high voltage signals, the voltage being stepped down by the turns ratio of the transformer. Alternative techniques for primary side sensing (e.g., sensing a voltage of the primary winding, preferably capacitor coupled so that it can be referenced to the ground of the controller and stepped down using a potential divider, as shown by the inset example circuit of FIG. 9 with a dashed connection to the primary winding 16), and thus the auxiliary winding of FIG. 1 may be omitted.

Figure 1:
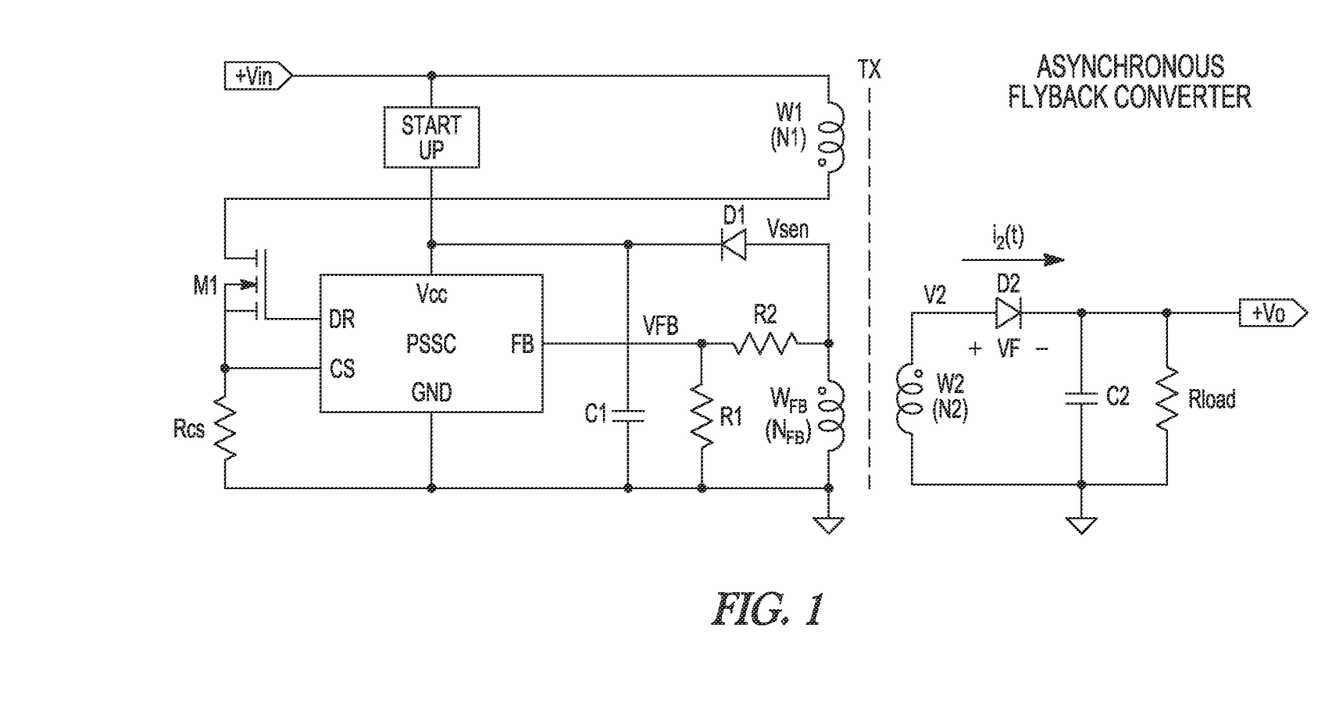
FIG. 1 shows an asynchronous flyback converter.

Primary Side Sensing Controllers (PSSC) in mains-isolated Switched Mode Power Converters (SMPC) generally utilise a primary referred feedback (FB) winding $W_{FB}$ to sample the voltage $V_{FB}$ reflected to the said FB winding from the controlled secondary winding W2 of the isolation transformer during the secondary conduction interval in the converter switching cycle. The sample is then used by the control loop to vary the control quantity in the loop in order to maintain the converter output quantity equal to a reference level. A generic circuit diagram of an example asynchronous flyback converter utilizing a PSSC is shown in FIG. 1.

The voltage $V_{FB}$ relates to the converter output voltage Vo as follows:

$$V_{FB} = \frac{N_{FB}}{N2} \cdot (V_o + V_F) \qquad \text{Eq. 1}$$

where N2 is the number of turns in the secondary winding, $N_{FB}$ is the number of turns in the FB winding, Vo is the output voltage and $V_F$ is the forward voltage drop across the rectifier. A disadvantage is that $V_F$ may become a source of error where the goal is to sample and control the output voltage Vo.

Figure 2:
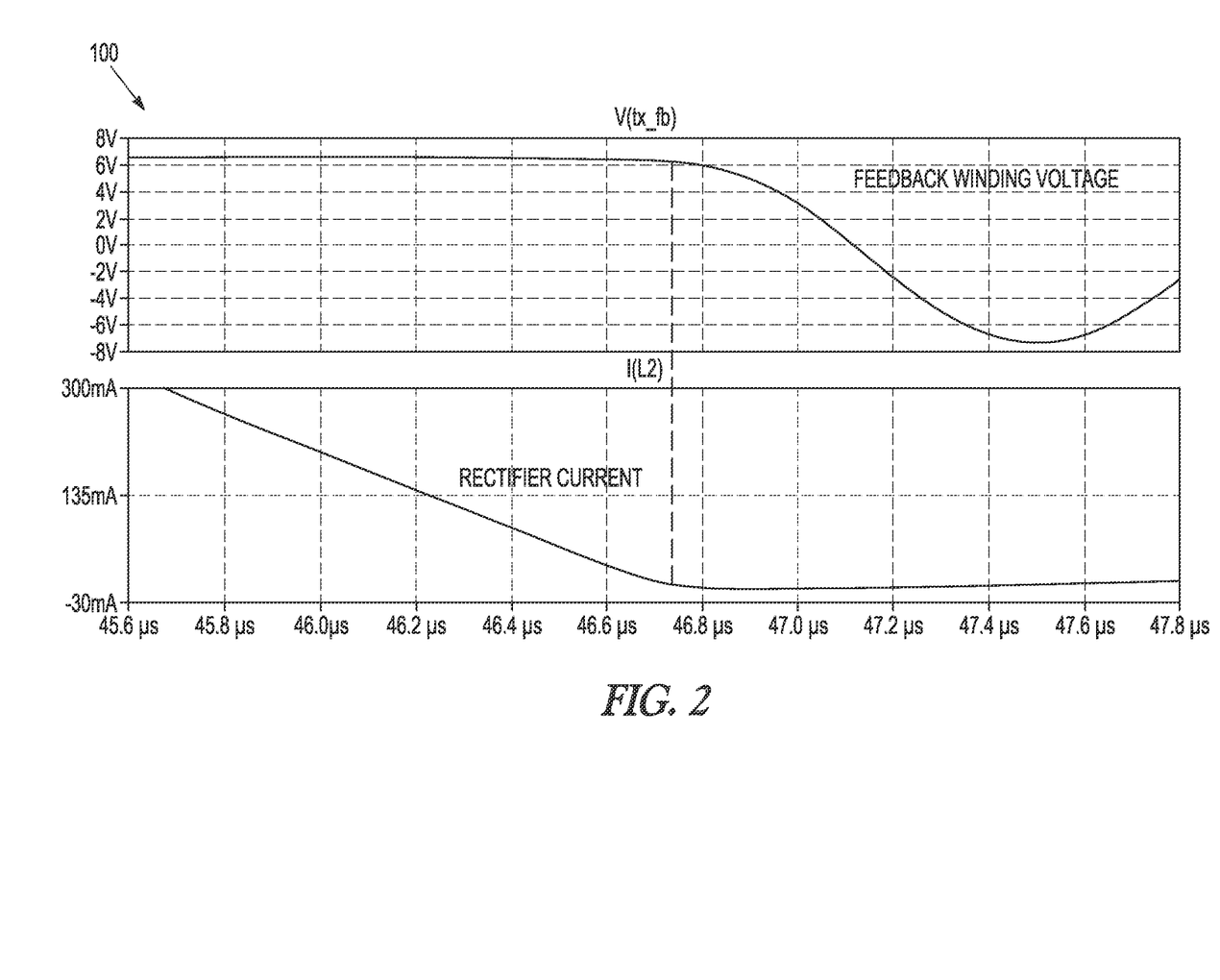
FIG. 2 shows waveforms for a discontinuous current mode flyback converter.

Generally, $V_F$ has two components. The first $V_{SER}$ is due to the series resistance of the rectifier device, the resistance of any bonding wires etc., and therefore depends on the current through the rectifier. The second component depends on the temperature and the nature of the rectification device. To minimise the error due to $V_{SER}$ the converter is operated in discontinuous current mode (DCM) and $V_{FB}$ is ideally sampled at the instant when the current through the rectifier falls to zero. Since the PSSC has no direct information on the secondary current, $V_{FB}$ is sampled at the onset of the idle oscillation in the transformer, at which point the rectifier current reaches zero. Usually a slope detector is used to detect this point on the $V_{FB}$ waveform. It is therefore desirable that in the vicinity of the sampling point the $V_{FB}$ is a monotonic time function in order to achieve accurate sampling. Typical waveforms for a DCM Flyback converter utilizing a diode rectifier are shown in FIG. 2.

Figure 3:
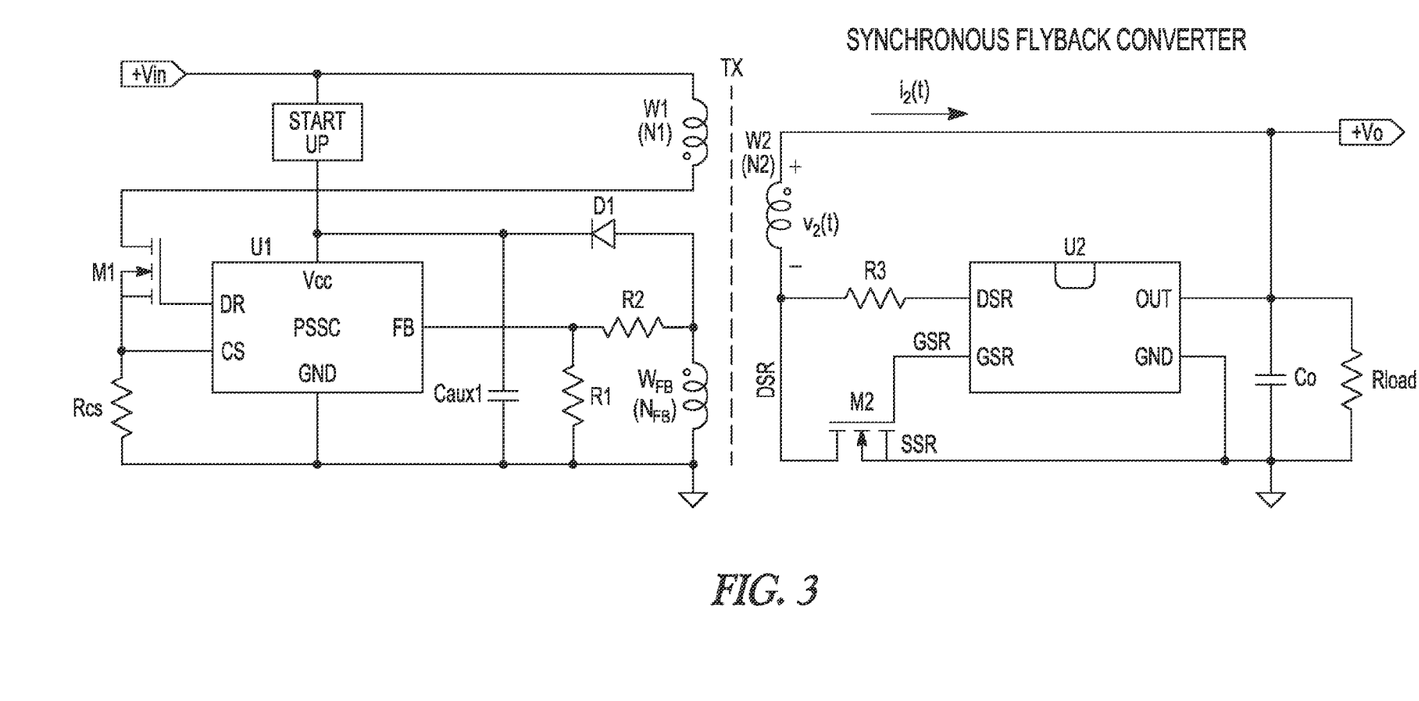
FIG. 3 shows a synchronous flyback converter.

When synchronous rectification is used with PSSC a disadvantage may arise with the sampling method described above if the synchronous rectifier is turned off rapidly. A synchronous Flyback converter and the corresponding DCM waveforms are shown in FIGS. 3 and 4, respectively.

Figure 4:
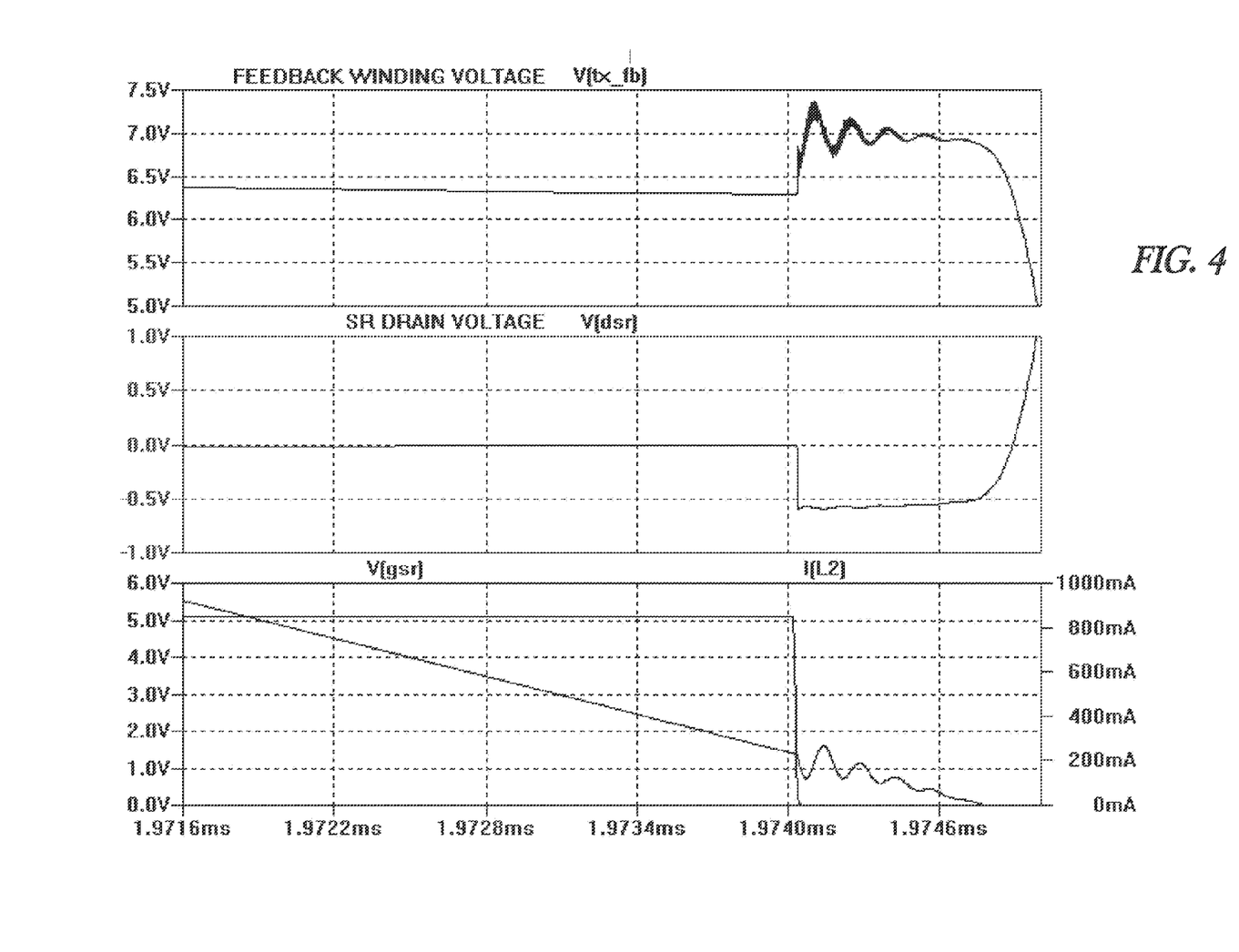
FIG. 4 shows waveforms for the synchronous flyback converter.

It is evident from FIG. 4 that the rapid turn off of the synchronous rectifier (SR) triggers two undesirable events:
  a) The secondary current $i_2(t)$ is switched from the MOSFET (M2) channel to its body diode, which results in a step increase in the feedback (FB) voltage.
  b) A resonant transient is excited involving the output capacitance of the SR and any series inductance.

These are disadvantageous regarding desired operation of the slope detector and potentially result in a sampling error. From a different perspective the described transient process may increase the electromagnetic interference (EMI) generated by the converter.

For use in understanding the present invention, the following disclosures are referred to:

NXP datasheet for TEA1761T Green Chip synchronous rectifier controller, at http://www.nxp.com/products/power_management/ac_to_dc_solutions/secondary_side_controllers/TEA1761T.html.

The field of switched mode power converters continues to provide a need for improvements in efficiency, for example where PSSC is implemented there is a need to provide synchronous rectification for improved efficiency while allowing good accuracy and/or stability of output regulation and/or reduced emission of electromagnetic interference (EMI).

SUMMARY

According to a first aspect of the present invention, there is provided a synchronous rectifier controller for a switched mode power supply (SMPS) comprising a synchronous rectifier, the SMPS having a power input, a switch, a transformer, an output capacitor and a power output, said transformer having a primary winding on a primary side of said SMPS coupled to said power input and said switch, and a secondary winding on a secondary side of said SMPS coupled to said power output and said output capacitor, said switch to switch power to said primary winding responsive to a drive signal, the SMPS further comprising sense circuitry on the primary side to sense a voltage on the secondary winding, the SMPS having a primary side sensing controller to control said drive signal according to at least the sensed voltage, the synchronous rectifier for blocking current flow from the output capacitor to the secondary winding, the synchronous rectifier controller comprising: a sensor to sense a signal on the secondary side, to thereby detect turn off of the switch; a charge source to, in response to a said detection, charge a control terminal of the synchronous rectifier to a voltage beyond a threshold voltage of the synchronous rectifier to allow the synchronous rectifier to conduct current of the secondary winding; and a linear amplifier having an output to sink current from the control terminal dependent on a difference between a voltage across the synchronous rectifier and an amplifier reference value, said voltage across the synchronous rectifier being a voltage across a controllable conduction path for current of the secondary winding, the linear amplifier thereby configured to inhibit discharge of the control terminal from the voltage beyond the threshold voltage until the voltage across the synchronous rectifier reaches the amplifier reference value.

Embodiments may avoid a hard turn-off of current on the secondary side, turn-off of the synchronous rectifier not occurring until the secondary current has significantly declined. Oscillation may thus be reduced in such an embodiment, reducing electromagnetic interference and/or improving SMPS regulation by allowing primary side sensing control to be based on the sensed signal sampled at a time of substantially (e.g., exactly) no oscillation. This may be achieved by briefly driving the synchronous rectifier on, preferably using a monostable pulse output, then allowing the synchronous rectifier control terminal to float before performing a soft turn-off shortly before the secondary current reaches zero—the turn-off for example by means of the linear, e.g., transconductance, amplifier operating in its active region to maintain voltage across the synchronous rectifier. This may avoid instant pull-down of the control terminal, which may otherwise result in rapid turn off of the synchronous rectifier and associated switching of secondary current from the channel of the synchronous rectifier to the body diode of the synchronous rectifier. By inhibiting the discharge of the control terminal, the control terminal is preferably maintained charged at a voltage above the voltage (e.g., Vgth of a field effect SR where the control terminal is a gate) during a time interval following the charging by the charge source (e.g., comprising a monostable operated switch). The inhibition may be achieved by the linear amplifier (e.g., an operational transconductance amplifier (OTA)) being saturated, i.e., operating beyond its active (generally linear) region, in a high output impedance state.

For the sense circuitry, an inductive element such as a sense winding may be used for primary side sensing (alternatively, a capacitor coupled circuit as shown in FIG. 9 and described above may be used). Such a sense winding may for example comprise an auxiliary winding of an isolation transformer having the primary and secondary windings. By sensing the current or voltage signal on the sense circuitry, the switch drive signal may be derived to regulate the output voltage of the SMPS.

The signal sensing on the secondary side may comprise comparing a voltage on the secondary side to a turn-off reference value. The signal may be a current or voltage, e.g., a voltage across the synchronous rectifier or any other voltage indicating current flow in the secondary winding. The turn-off detection may be based on detecting current flow through the secondary winding or synchronous rectifier, e.g., using a comparator to see when drain-source voltage of a fully enhanced field-effect, e.g., MOS, synchronous rectifier exceeds or crosses a threshold value. The voltage across the synchronous rectifier, i.e., voltage across a controllable conduction path for current of the secondary winding, may similarly be such a drain-source voltage.

There may further be provided the synchronous rectifier controller, wherein the linear amplifier is configured to, when the voltage across the synchronous rectifier differs from the amplifier reference value such that the linear amplifier is active, discharge the control terminal to the threshold voltage of the synchronous rectifier such that the voltage across the synchronous rectifier is stabilised relative to the amplifier reference value. Preferably, the discharging is performed such that the voltage across the synchronous rectifier is maintained substantially (e.g., exactly) equal to the amplifier reference value. The stabilisation may be achieved by feedback of the voltage across the SR to an input of the linear amplifier for comparison to the amplifier reference value.

Thus, an embodiment may allow controlled gate discharge, achieved by feedback to the linear amplifier to maintain the voltage across the synchronous rectifier, e.g., drain-source voltage of a field-effect, e.g., MOS, synchronous rectifier. Such maintaining of the voltage may involve modulation of the channel of such a synchronous rectifier. In an embodiment, the controlled discharge may occur when the voltage across the synchronous rectifier exceeds or is above the amplifier reference value. The linear amplifier is preferably then in its active operating region (i.e., not in a saturated state), where for a linear amplifier in the form of an ideal trans-conductance amplifier the output current is proportional to the difference between voltage inputs.

There may further be provided the synchronous rectifier controller, wherein the charge source comprises a monostable circuit to cause delivery of a charge pulse to thereby charge the control terminal to the voltage beyond the threshold voltage. For example, a monostable may output a voltage pulse to control a switch to allow a corresponding charge to be delivered to the control terminal. In this case, the control terminal should be driven well beyond the threshold voltage, e.g., at least 1-2V beyond. A field effect synchronous rectifier is preferably over-driven to force the rectifier to leave the pinch-off state (wherein generally the body diode may carry all of the current) and become fully enhanced. While the channel is fully enhanced the channel may have a substantially fixed resistance and may thus act ohmically. The synchronous rectifier may be used as a sense resistance to allow sensing of the synchronous rectifier current and/or current. Such sensing may be used to determine the timing of the start of a soft turn-off phase of the synchronous rectifier when the channel voltage is controlled by feedback to the linear amplifier operating in its active region.

The linear amplifier may be a trans-conductance, voltage or current amplifier. Such an amplifier is generally not for example exponential in its active region. In the active region the output is linearly related, i.e. a substantially constant multiple of the, input.

There may further be provided the synchronous rectifier controller, wherein the linear amplifier is configured to have high output impedance (e.g., more than 10 megaohms or more than 100 megaohms) when the voltage across the synchronous rectifier is below the amplifier reference value, said high output impedance for said substantially inhibiting discharge of the control terminal. The high output impedance is preferably that of a saturation state of the linear amplifier, wherein output current from the amplifier is substantially inhibited to thereby leave the control terminal floating. This may allow the control terminal to remain charged at a voltage beyond the threshold voltage during a time interval following the charging by the charge source.

There may further be provided the synchronous rectifier controller, wherein said sensor comprises a comparator to compare a current or voltage on the secondary side to a turn-off reference value. The sensor may control the charge source, preferably in the form of a monostable-controlled switch, to turn on a current flow to drive the synchronous rectifier such that conduction in the rectifier is transferred from the body diode of the SR to the channel of the SR. The synchronous rectifier current may then reduce smoothly, preferably linearly, and may be used to determine the timing of the start of a soft turn-off phase of the synchronous rectifier when the channel voltage is controlled by feedback to the linear amplifier operating in its active region.

There may further be provided the synchronous rectifier controller, wherein the linear (e.g., trans-conductance) amplifier is configured to have low output impedance (e.g., less than 100 milliohms, or less than 10 milliohms) when current through the synchronous rectifier is substantially zero. This may fully discharge the control terminal of the SR to zero volts (relative to the source of the SR; 0V may be a ground voltage). The current through the SR at this stage is substantially zero. In an embodiment such low output impedance may occur when the voltage across the SR, which is fed back to an input of the amplifier, is above a reference value to which it is compared, for example before the primary switch turns off and/or when the primary switch is off and the SR control terminal has reached the rectifier threshold voltage.

There may further be provided the synchronous rectifier controller, comprising: a comparator to compare the voltage across the synchronous rectifier to a reference voltage (e.g., 0V or ground, preferably the SR source voltage for a field effect, e.g., MOS, SR); and a switch to couple the reference voltage to the control terminal when current through the synchronous rectifier is substantially zero. This may be achieved by coupling the switch in response to detecting when the voltage across the synchronous rectifier is above (or, in another embodiment, below) the reference voltage. Such a comparator and switch arrangement may short source and control terminals of the SR and thus assist the full discharge of the SR control terminal. This may be of advantage for example where the output impedance of the linear (e.g., trans-conductance) amplifier cannot provide hard pull down of the synchronous rectifier control terminal. An embodiment may improve noise immunity—otherwise any interference or idle ring on the secondary winding voltage after secondary current reaches zero may turn the SR back on.

There may further be provided the synchronous rectifier controller, wherein the magnitude of the amplifier reference value is less than or equal to the magnitude of a forward voltage drop of a body diode of the synchronous rectifier, the magnitude of the amplifier reference value preferably within the range of about (e.g. exactly) 0.3 to about 0.4V.

There may further be provided the synchronous rectifier controller, wherein the magnitude of the turn-off reference value is greater than zero, preferably within the range of about 0.04 to about 0.06V. The value may be set close to zero to allow detection of a low but controllable current in the synchronous rectifier. (Zero volts generally being the voltage of source of the SR, e.g., the source terminal of a field-effect SR such as a MOSFET).

There may be provided a switch mode power supply (SMPS) comprising the synchronous rectifier controller.

There may further be provided the SMPS, wherein the SMPS is a flyback converter operable in discontinuous current mode.

According to a second aspect of the present invention, there is provided a synchronous rectifier controller for a switched mode power supply (SMPS) comprising a synchronous rectifier, the SMPS having a power input, a switch, a transformer, an output capacitor and a power output, said transformer having a primary winding on a primary side of said SMPS coupled to said power input and said switch, and a secondary winding on a secondary side of said SMPS coupled to said power output and said output capacitor, said switch to switch power to said primary winding responsive to a drive signal, the SMPS further comprising sense circuitry on the primary side to sense a voltage on the secondary winding, the SMPS having a primary side sensing controller to control said drive signal according to at least the sensed voltage, the synchronous rectifier for blocking current flow from the output capacitor to the secondary winding, the synchronous rectifier controller comprising: a linear amplifier having an output to sink current from a control terminal of the synchronous rectifier dependent on a difference between a voltage across the synchronous rectifier and an amplifier reference value, said voltage across the synchronous rectifier being a voltage across a controllable conduction path for current of the secondary winding, wherein the linear amplifier is configured to, when the voltage across the synchronous rectifier differs from the amplifier reference value such that the linear amplifier is active, discharge the control terminal to the threshold voltage of the synchronous rectifier such that the voltage across the synchronous rectifier approaches the amplifier reference value.

Preferably, the discharge is controlled by maintaining the voltage across the synchronous rectifier substantially (e.g., exactly) equal to the amplifier reference value. This may effectively result in modulation of the channel of a field effect synchronous rectifier during the discharge and thus a controlled turn-off.

There may further be provided the synchronous rectifier controller, comprising: a sensor to sense a signal on the secondary side, to thereby detect turn off of the switch; a charge source to, in response to a said detection, charge a control terminal to a voltage beyond a threshold voltage of the synchronous rectifier to allow the synchronous rectifier to conduct current of the secondary winding; and the linear amplifier having the output to sink current from the control terminal dependent on the difference thereby configured to inhibit discharge of the control terminal from the voltage beyond the threshold voltage until the voltage across the synchronous rectifier reaches the amplifier reference value.

There may further be provided a switch mode power supply (SMPS) comprising the synchronous rectifier controller.

There may further be provided the SMPS, wherein the SMPS is a flyback converter operable in discontinuous current mode.

According to a third aspect of the present invention, there is provided a method for controlling a synchronous rectifier of a switched mode power supply (SMPS), the SMPS having a power input, a switch, a transformer, an output capacitor and a power output, said transformer having a primary winding on a primary side of said SMPS coupled to said power input and said switch, and a secondary winding on a secondary side of said SMPS coupled to said power output and said output capacitor, said switch to switch power to said primary winding responsive to a drive signal, the SMPS further comprising sense circuitry on the primary side to sense a voltage on the secondary winding, the SMPS having a primary side sensing controller to control said drive signal according to at least the sensed voltage, the synchronous rectifier for blocking current flow from the output capacitor to the secondary winding, the method comprising: detecting turn off of the switch; in response to said detecting, supplying charge to a control terminal of the synchronous rectifier, to thereby charge the control terminal to a voltage beyond a threshold voltage of the synchronous rectifier to allow the synchronous rectifier to conduct current of the secondary winding; allowing the control terminal to remain charged at the voltage beyond the threshold voltage during a time interval following the charge supplying, while allowing current said secondary winding to decline; detecting when voltage across the synchronous rectifier reaches an amplifier reference value, to thereby trigger discharge of the control terminal to the threshold voltage, said voltage across the synchronous rectifier being a voltage across a controllable conduction path for current of the secondary winding; and coupling the control terminal to a reference voltage to further discharge the control terminal, wherein said discharge to the threshold voltage comprises controlling current to the control terminal such that the voltage across the synchronous rectifier approaches the amplifier reference value.

Preferably, the voltage across the synchronous rectifier is maintained substantially (e.g., exactly) equal to the amplifier reference value by a controlled discharge of the synchronous rectifier control. This may effectively result in modulation of the channel of a field effect synchronous rectifier during the discharge and thus a gradual turn-off.

Preferably, current flowing through the secondary winding and the synchronous rectifier gradually reduces, e.g. linearly, during the time interval following the charge supplying. Thus, the synchronous rectifier is not turned off until the secondary current has reduced. Furthermore, the turn off of the rectifier may be controlled to proceed gradually using feedback to a linear (e.g., trans-conductance) amplifier, the feedback causing modulation of a conduction channel of the rectifier to thereby maintain voltage across the rectifier close to a reference value. A hard turn-off may thus be avoided.

There may further be provided the method, wherein said detecting turn off of the switch comprises comparing the voltage across the synchronous rectifier to a turn-off reference value. This may be achieved by detecting current flow through the secondary winding and/or synchronous rectifier, e.g., using a comparator to see when a drain-source voltage of a field-effect SR exceeds a threshold.

There may further be provided the method, wherein said supplying charge comprises triggering a monostable circuit to cause delivery of a charge pulse to the control terminal.

There may further be provided the method, wherein the synchronous rectifier comprises a field effect device and the charging the control terminal beyond the threshold voltage causes transfer of secondary winding current from a body diode of the field effect device to a channel of the field effect device.

There may further be provided the method, wherein the allowing the control terminal to remain charged is performed by allowing the control terminal to float.

There may further be provided the method, wherein the allowing the control terminal to remain charged comprises inhibiting current flow through an output of a linear amplifier such as a trans-conductance amplifier.

There may further be provided the method, comprising comparing the voltage across the synchronous rectifier to the amplifier reference value and a turn-off reference value, to thereby perform said inhibiting when the voltage across the synchronous rectifier is between the amplifier and turn-off reference values.

There may further be provided the method, comprising comparing the voltage across the synchronous rectifier to a reference voltage and controlling a switch to apply the reference voltage to the control terminal when current through the synchronous rectifier is substantially zero.

There may further be provided the method, wherein the SMPS is a flyback converter operable in discontinuous current mode.

(Noting that reference to 'above' and 'below' herein may be changed to 'below' and 'above' for embodiment operating with a power supply of opposite polarity compared to that applied for example to embodiments herein, e.g., for an embodiment using a p-channel field effect synchronous rectifier. Furthermore, references to, e.g., 'inhibit' or 'equal to' may mean substantially (e.g., completely) inhibit or substantially (e.g., exactly) equal to, respectively).

Preferred embodiments are defined in the appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

Generally, embodiments provide methods for soft turn off of a synchronous rectifier (SR) such as a field effect (e.g., MOSFET) SR, and a circuit implementing the method. The method may eliminate the sampling errors in Primary Side Sensing (PSS) controllers and/reduce EMI emitted from the SMPS; which may be caused by conventional hard driven synchronous rectifiers. Advantageously, an embodiment is utilised in a discontinuous, synchronous Flyback converter.

Embodiments deliver methods for driving a SR, preferably a MOSFET SR, in a way that is compatible with PSS used in Switched Mode Power Converters (SMPC), and circuit implementation of the said method. (Embodiments are applicable to DC-DC converters and AC-DC supplies, so that SMPC and SMPS (Switched Mode Power Supply) are used interchangeably herein).

The synchronous rectifier (SR) controller, or SR driver, may be a MOSFET driver specifically designed for use in a single switch Flyback converter operating in DCM. A converter topology is shown in FIG. 3, which shows power input +Vin, switch M1 driven by drive signal from output DR, transformer TX, output capacitor Co, power output +Vo and primary side sensing controller U1. The transformer TX comprises primary and secondary windings W1, W2, respectively and sense circuitry, e.g., feedback winding WFB; the sense winding forming sense circuitry in this embodiment. An example block diagram of the SR controller is shown below in FIG. 5. The block diagram shows at least part of the secondary side control circuit U2 in the circuit in FIG. 3. The operation of the driver is illustrated by the waveforms in FIG. 6.

Figure 5:
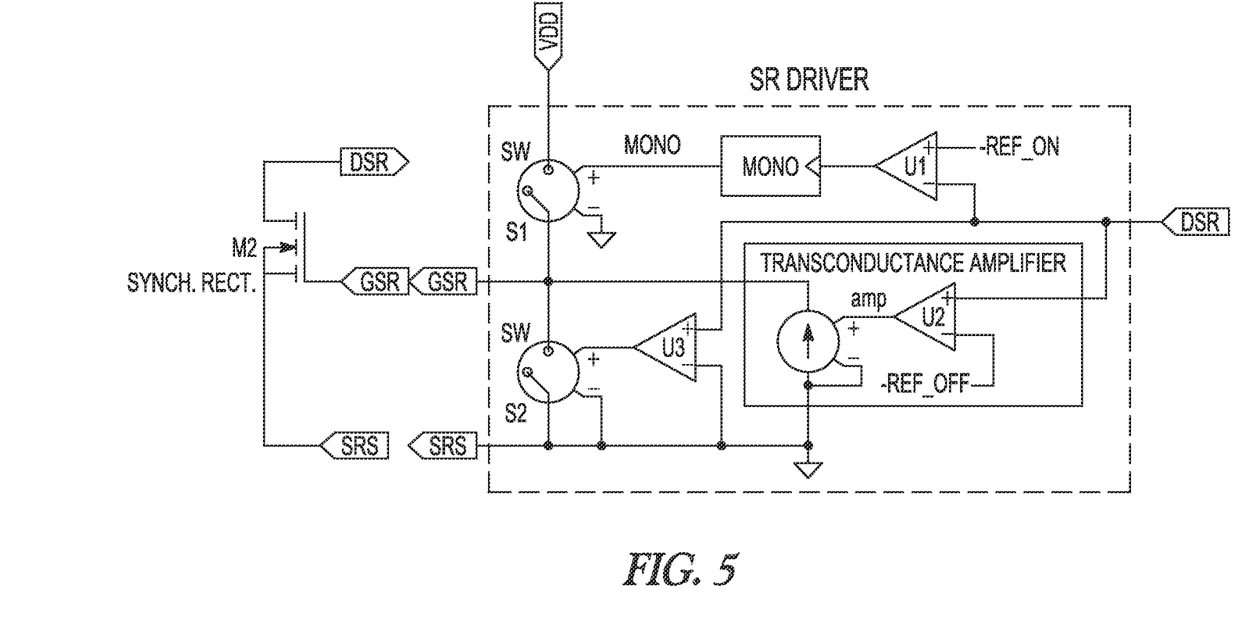
FIG. 5 shows a synchronous rectifier driver embodiment.
Figure 6:
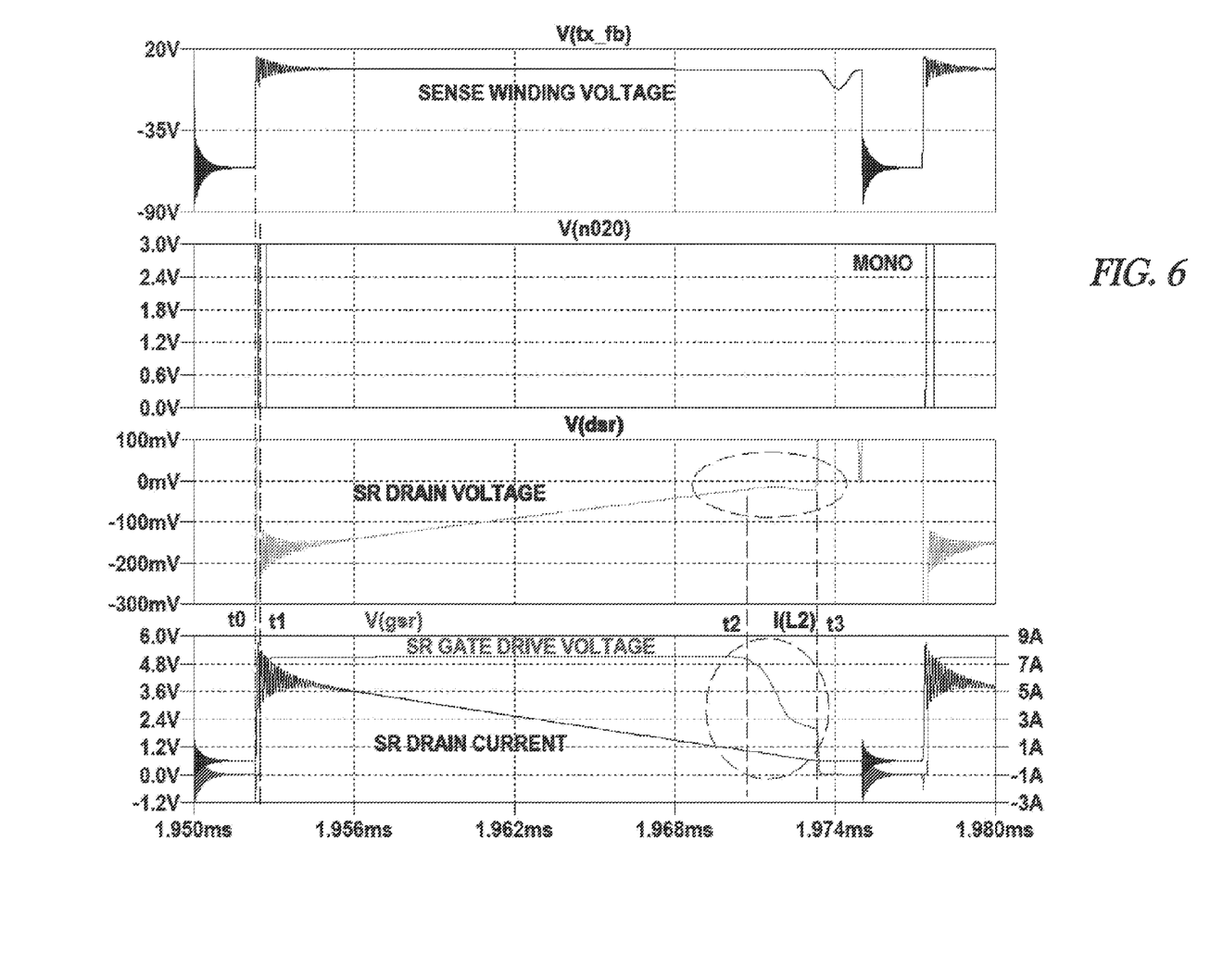
FIG. 6 shows waveforms for the synchronous rectifier driver embodiment.
Figure 7:
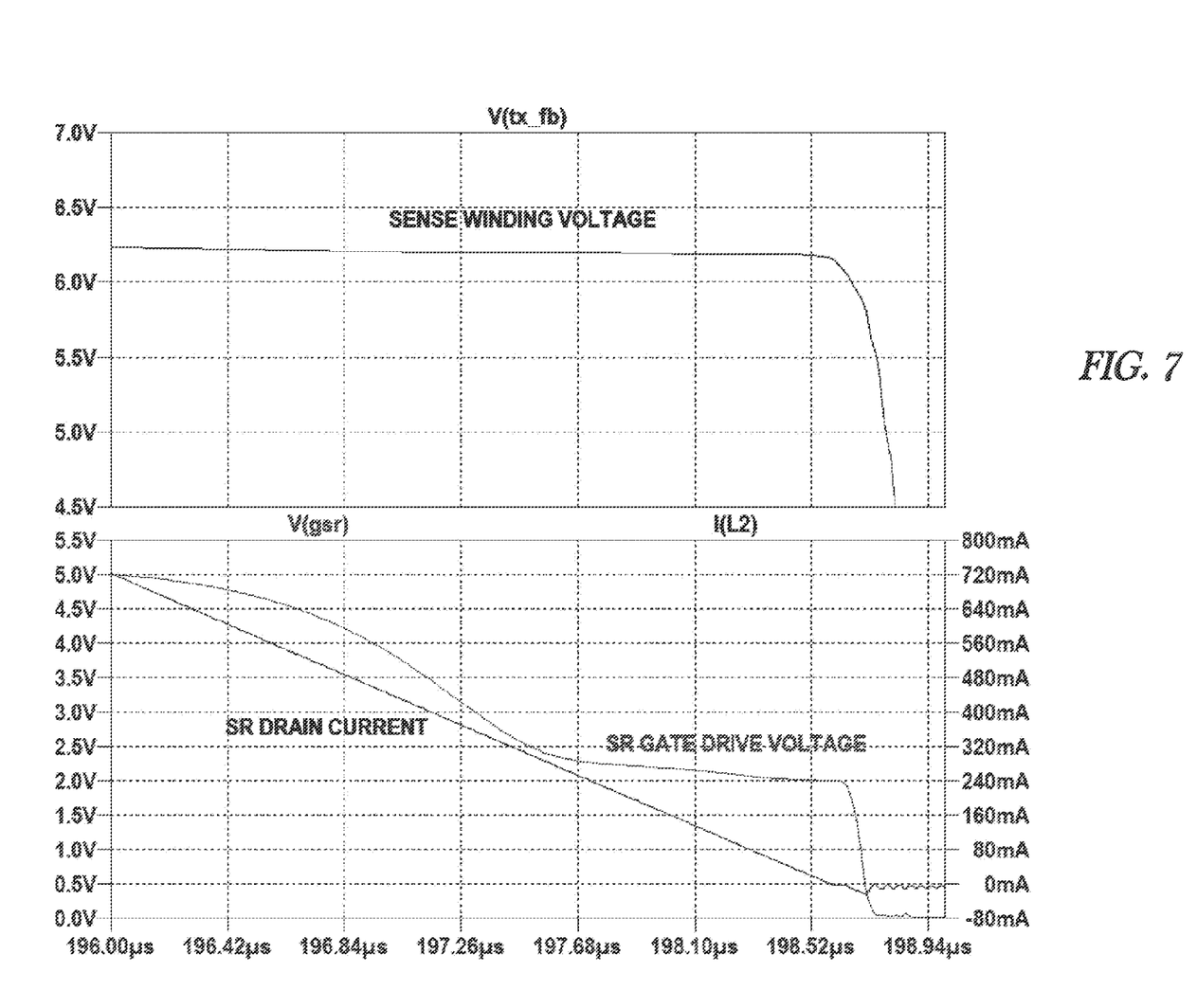
FIG. 7 shows time t2 to t3 of FIG. 6 in more detail.
Figure 8:
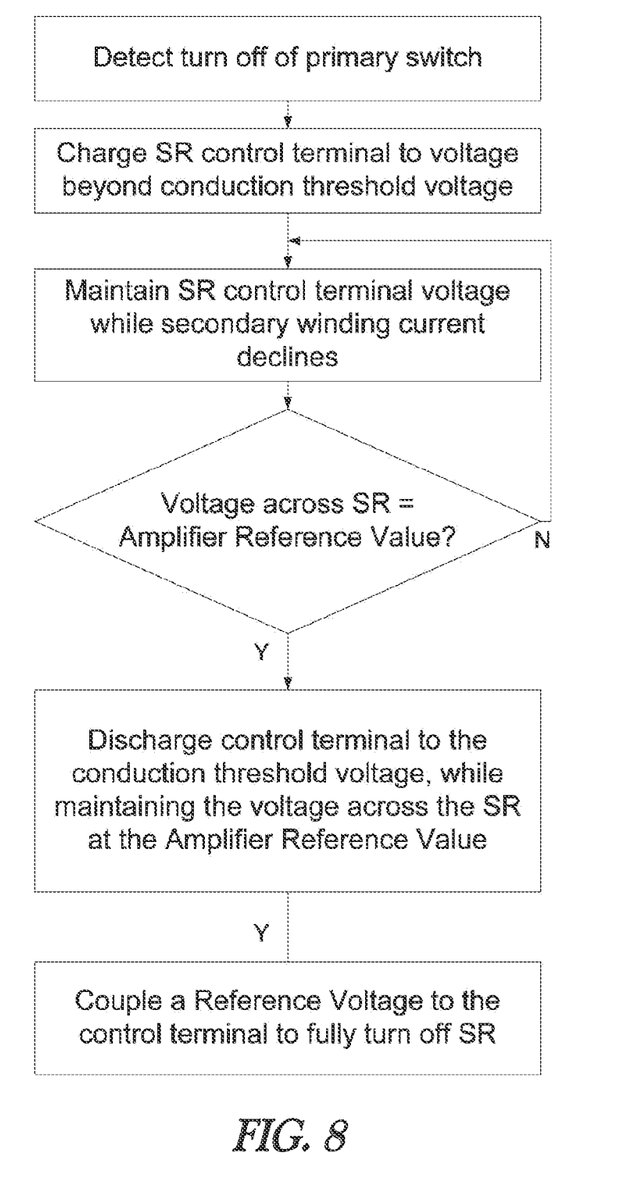
FIG. 8 shows a flowchart of a method embodiment.

All voltages are referenced to the source of the SR (SRS). The driver comprises two voltage comparators U1 and U3, and a trans-conductance amplifier comparing the voltage across the channel of the SR to two fixed levels −REF_ON and −REF_OFF (−REF_ON and −REF_OFF in the illustrated example being negative quantities, i.e., REF_ON being the magnitude of −REF_ON), where REF_OFF<REF_ON. −REF_OFF may be referred to as an amplifier reference value, whereas −REF_ON may be referred to as a turn-off reference value. REF_ON is slightly lower than the forward voltage drop of the SR body diode (typically 0.3V to 0.4V). REF_OFF is 40 mV-60 mV. In this regard it is noted that a trans-conductance amplifier is indicated in the present embodiment, however any linear amplifier, e.g., a linear voltage amplifier or a linear current amplifier, may be used.

Comparator U3 and switch S2 ensures that for $V_{DSR}>0$ ($V_{DSR}$ being voltage across the SR) the SR channel is driven in pinch-off ($V_{GSR}=0$) and the SR FET M2 (preferably an n-channel MOSFET) supports positive voltage. The rectification interval starts at t0 when the primary switch M1 (FIG. 3) is turned off. At this point $V_{GSR}=0$ and the body diode of the SR (M2) breaks into conduction, carrying the entire secondary current $i_2(t)$. The voltage across SR exceeds REF_ON (falls below −VREF_ON) and the sensor in the form of comparator U1 changes state. This triggers the monostable MONO (t=t1), which outputs to switch S1 (coupled to the power line VDD and thus effectively forming a charge source controllable by the monostable MONO of FIG. 5) a control pulse of a predetermined duration. (It could be considered to refer to the charge source as effectively being a current source, however the amplitude of the charging current may be uncontrolled while the source is controlled on). The input capacitance of the SR is quickly charged above the threshold voltage, in this case a FET gate threshold voltage $V_{TH}$. This causes the rapid transfer of the secondary current from the body diode to the channel of the SR. With the M2 channel fully enhanced the voltage across the SR becomes proportional to the secondary current as described by below:

$$v_{DSR}(t)=R_{DSon}\cdot i_2(t) \qquad (\text{Eq. 2})$$

Immediately after M2 is gated ON (at t=t1) the secondary current is high enough so that $$-\text{REF\_ON}<V_{DSR}(t1)=R_{DSon}\cdot i_2(t1)<-\text{REF\_OFF} \qquad (\text{Eq. 3})$$

Consequently the trans-conductance amplifier is saturated and it outputs zero current. The control terminal in the form of the M2 gate remains charged above the $V_{TH}$. The secondary current reduces linearly until at time t2 the trans-conductance amplifier becomes active. At time t=t2

$$v_{DSR}(t2)=-R_{DSon}\cdot i2(t2)=-\text{REF\_OFF} \qquad (\text{Eq. 4})$$

At this point the trans-conductance amplifier begins to discharge the gate of the SR in order to maintain $V_{DSR}$ equal to −REF_OFF. (U2 drives a voltage controlled current source to form a trans-conductance amplifier, which has a reference −REF_OFF). Negative feedback in the amplifier may maintain the voltage across the channel of the SR (M1) equal to this reference. (In an embodiment, the trans-conductance amplifier (operating in its active or linear region, i.e., not saturated) can be considered as being in a closed negative feedback loop involving control of $V_{DSR}$ via the trans-conductance amplifier output to the gate of the SR and feedback of $V_{DSR}$ to the trans-conductance amplifier input that is compared to −REF_OFF). Effectively the M2 channel is being modulated to maintain a small negative voltage across it. This gradual modulation is driven by the declining secondary current $i_2(t)$, which at time t3 reaches zero. At this point the trans-conductance amplifier output saturates, effectively shorting the gate of M2 to its source. (Ideally the trans-conductance amplifier should have zero output impedance when saturated in one direction (high current) and infinite output impedance when saturated in the opposite direction (zero current). In reality when saturated in high current its output impedance is greater than zero (the actual value depends on the particular design). Comparator U3 (for comparing $V_{DSR}$ to the reference voltage, here the source voltage $V_{SRS}$) and switch S2 are optionally added to make up for imperfections of the actual trans-conductance amplifier, i.e., non-zero output impedance. Typically S2 would have on-state resistance several orders of magnitude lower than the static output resistance of the saturated trans-conductance amplifier. S2 and U3 are a protection feature added for example for robustness. The trans-conductance amplifier is an analogue control stage).

In an embodiment, at the start of the synchronous rectification a fixed amount of charge may be delivered to the SR gate through S1, the amount determined by the on-state resistance of S1, the input capacitance of the SR, the value of VDD and the duration of the monostable pulse. After that pulse the output impedance of the driver may be maintained high (preferably infinite) up until t2 when $$v_{DSR}(t2)=-R_{DSon}\cdot i2(t2)=\text{REF\_OFF}$$

From the point of expiration of the pulse from MONO until t2 the driver may be effectively inactive. It does not connect the SR gate to any fixed voltage level. The driver output impedance to ground may become finite at t2 when the trans-conductance amplifier becomes active.

In an embodiment, the steady decline in the drain current during the rectification interval may be solely determined by the power converter topology. During the regulation state at the end of the rectification interval the gate capacitance of the SR may be discharged at a rate controlled by the trans-conductance amplifier. Gate-source voltage $V_{GS}$ of the SR may be gradually reduced until it reaches the gate threshold $V_{TH}$. The trans-conductance amplifier may then be acting to stabilise VDS around a negative reference −REF_OFF until the drain current reaches zero. After that the transconductance amplifier may drive $V_{GS}$ below the gate threshold $V_{TH}$. Eventually the transconductance amplifier may run out of control range and $V_{GS}$ reaches zero. Of interest, the SR gate may not be pulled to ground before $V_{DS}$ reaches zero. Comparator U3 may pull down the SR gate only when $V_{DSR}$ becomes positive. This may prevent the SR from discharging the output filter capacitor.

In an embodiment, $V_{FB}$ may be sampled at the point when the rectifier current reaches zero. This point may be detected using a slope detector receiving (preferably directly) the $V_{FB}$ waveform.

In view of the above, embodiments may facilitate a gradual turn off of the SR at the end of the secondary conduction interval of the Flyback converter. The gradual turn off may be achieved by modulating the channel of the SR MOSFET in order to maintain a constant drain-to-source voltage shortly before the linearly decreasing secondary current $i_2(t)$ reaches zero. This may avoid the switching of the rectified transformer secondary current $i_2(t)$ from the channel of the SR to the body diode of the SR as may occur for a conventional (hard) turn off.

Embodiments may therefore deliver a method for driving a synchronous rectifier (SR) semiconductor switches, preferably MOSFETs, in a way that is compatible with PSSC used in SMPC, and circuit implementations of the said method applicable to discontinuous, synchronous, single-switch Flyback converters. More particularly such methods and circuits may facilitate a gradual (soft) turn off of the SR at the end of a secondary conduction interval (rectification), and thus may avoid the switching of the rectified current from the MOSFET channel to the MOSFET body diode as may occur for conventional hard turn off of the SR. This may remove the rapid increase in the sense winding voltage and/or the resulting resonant transient, thus in embodiments eliminating or reducing the sampling error in the PSS caused by those events.

Additionally the soft turn-off of the SR may promote lower conducted and radiated EMI.

No doubt many other effective alternatives will occur to the skilled person. It will be understood that the invention is not limited to the described embodiments and encompasses modifications apparent to those skilled in the art lying within the spirit and scope of the claims appended hereto.

Exemplary Embodiments

1. Synchronous rectifier controller for a switched mode power supply (SMPS) comprising a synchronous rectifier, the SMPS having a power input, a switch, a transformer, an output capacitor and a power output, said transformer having a primary winding on a primary side of said SMPS coupled to said power input and said switch, and a secondary winding on a secondary side of said SMPS coupled to said power output and said output capacitor, said switch to switch power to said primary winding responsive to a drive signal, the SMPS further comprising sense circuitry on the primary side to sense a voltage on the secondary winding, the SMPS having a primary side sensing controller to control said drive signal according to at least the sensed voltage, the synchronous rectifier for blocking current flow from the output capacitor to the secondary winding, the synchronous rectifier controller comprising:
   a sensor to sense a signal on the secondary side, to thereby detect turn off of the switch;
   a charge source to, in response to a said detection, charge a control terminal of the synchronous rectifier to a voltage beyond a threshold voltage of the synchronous rectifier to allow the synchronous rectifier to conduct current of the secondary winding; and
   a linear amplifier having an output to sink current from the control terminal dependent on a difference between a voltage across the synchronous rectifier and an amplifier reference value, said voltage across the synchronous rectifier being a voltage across a controllable conduction path for current of the secondary winding, the linear amplifier thereby configured to inhibit discharge of the control terminal from the voltage beyond the threshold voltage until the voltage across the synchronous rectifier reaches the amplifier reference value.

2. Synchronous rectifier controller of example 1, wherein the linear amplifier is configured to, when the voltage across the synchronous rectifier differs from the amplifier reference value such that the linear amplifier is active, discharge the control terminal to the threshold voltage of the synchronous rectifier such that the voltage across the synchronous rectifier is stabilised relative to the amplifier reference value.

3. Synchronous rectifier controller of any preceding example, wherein the charge source comprises a monostable circuit to cause delivery of a charge pulse to thereby charge the control terminal to the voltage beyond the threshold voltage.

4. Synchronous rectifier controller of any preceding example, wherein the linear amplifier comprises a transconductance amplifier.

5. Synchronous rectifier controller of any preceding example, wherein the linear amplifier is configured to have high output impedance when the voltage across the synchronous rectifier is below the amplifier reference value, said high output impedance for said inhibiting discharge of the control terminal.

6. Synchronous rectifier controller of any preceding example, wherein said sensor comprises a comparator to compare a current or voltage on the secondary side to a turn-off reference value.

7. Synchronous rectifier controller of any preceding example, wherein the linear amplifier is configured to have low output impedance when current through the synchronous rectifier is zero.

8. Synchronous rectifier controller of example 7, comprising:
   a comparator to compare the voltage across the synchronous rectifier to a reference voltage; and
   a switch to couple the reference voltage to the control terminal when current through the synchronous rectifier is zero.

9. Synchronous rectifier controller of any preceding example, wherein the magnitude of the amplifier reference value less than or equal to the magnitude of a forward voltage drop of a body diode of the synchronous rectifier, the magnitude of the amplifier reference value preferably within the range of about 0.3 to about 0.4V.

10. Synchronous rectifier controller of example 6, wherein the magnitude of the turn-off reference value is greater than zero, preferably within the range of about 0.04 to about 0.06V.

11. Switch mode power supply (SMPS) comprising the synchronous rectifier controller of any preceding example.

12. The SMPS of example 11, wherein the SMPS is a flyback converter operable in discontinuous current mode.

13. Synchronous rectifier controller for a switched mode power supply (SMPS) comprising a synchronous rectifier, the SMPS having a power input, a switch, a transformer, an output capacitor and a power output, said transformer having a primary winding on a primary side of said SMPS coupled to said power input and said switch, and a secondary winding on a secondary side of said SMPS coupled to said power output and said output capacitor, said switch to switch power to said primary winding responsive to a drive signal, the SMPS further comprising sense circuitry on the primary side to sense a voltage on the secondary winding, the SMPS having a primary side sensing controller to control said drive signal according to at least the sensed voltage, the synchronous rectifier for blocking current flow from the output capacitor to the secondary winding, the synchronous rectifier controller comprising:
    a linear amplifier having an output to sink current from a control terminal of the synchronous rectifier dependent on a difference between a voltage across the synchronous rectifier and an amplifier reference value, said voltage across the synchronous rectifier being a voltage across a controllable conduction path for current of the secondary winding,
    wherein the linear amplifier is configured to, when the voltage across the synchronous rectifier differs from the amplifier reference value such that the linear amplifier is active, discharge the control terminal to the threshold voltage of the synchronous rectifier such that the voltage across the synchronous rectifier approaches the amplifier reference value.

14. Synchronous rectifier controller of example 13, comprising:
    a sensor to sense a signal on the secondary side, to thereby detect turn off of the switch;
    a charge source to, in response to a said detection, charge a control terminal to a voltage beyond a threshold voltage of the synchronous rectifier to allow the synchronous rectifier to conduct current of the secondary winding; and
    the linear amplifier having the output to sink current from the control terminal dependent on the difference thereby configured to inhibit discharge of the control terminal from the voltage beyond the threshold voltage until the voltage across the synchronous rectifier reaches the amplifier reference value.

15. Switch mode power supply (SMPS) comprising the synchronous rectifier controller of examples 13 or 14.

16. The SMPS of example 15, wherein the SMPS is a flyback converter operable in discontinuous current mode.

17. Method for controlling a synchronous rectifier of a switched mode power supply (SMPS), the SMPS having a power input, a switch, a transformer, an output capacitor and a power output, said transformer having a primary winding on a primary side of said SMPS coupled to said power input and said switch, and a secondary winding on a secondary side of said SMPS coupled to said power output and said output capacitor, said switch to switch power to said primary winding responsive to a drive signal, the SMPS further comprising sense circuitry on the primary side to sense a voltage on the secondary winding, the SMPS having a primary side sensing controller to control said drive signal according to at least the sensed voltage, the synchronous rectifier for blocking current flow from the output capacitor to the secondary winding, the method comprising:
    detecting turn off of the switch;
    in response to said detecting, supplying charge to a control terminal of the synchronous rectifier, to thereby charge the control terminal to a voltage beyond a threshold voltage of the synchronous rectifier to allow the synchronous rectifier to conduct current of the secondary winding;
    allowing the control terminal to remain charged at the voltage beyond the threshold voltage during a time interval following the charge supplying, while allowing current in said secondary winding to decline;
    detecting when voltage across the synchronous rectifier reaches an amplifier reference value, to thereby trigger discharge of the control terminal to the threshold voltage, said voltage across the synchronous rectifier being a voltage across a controllable conduction path for current of the secondary winding; and
    coupling the control terminal to a reference voltage to further discharge the control terminal,
    wherein said discharge to the threshold voltage comprises controlling current to the control terminal such that the voltage across the synchronous rectifier approaches the amplifier reference value.

18. Method of example 17, wherein said detecting turn off of the switch comprises comparing the voltage across the synchronous rectifier to a turn-off reference value.

19. Method of any one of examples 17 to 18, wherein said supplying charge comprises triggering a monostable circuit to cause delivery of a charge pulse to the control terminal.

20. Method of any one of examples 17 to 19, wherein the synchronous rectifier comprises a field effect device and the charging the control terminal beyond the threshold voltage causes transfer of secondary winding current from a body diode of the field effect device to a channel of the field effect device.

21. Method of any one of examples 17 to 20, wherein the allowing the control terminal to remain charged is performed by allowing the control terminal to float.

22. Method of any one of examples 17 to 21, wherein the allowing the control terminal to remain charged comprises inhibiting current flow through an output of a linear amplifier.

23. Method of example 22, comprising comparing the voltage across the synchronous rectifier to the amplifier reference value and a turn-off reference value, to thereby perform said inhibiting when the voltage across the synchronous rectifier is between the amplifier and turn-off reference values.

24. Method of any one of examples 17 to 23, comprising comparing the voltage across the synchronous rectifier to the reference voltage and controlling a switch to apply the reference voltage to the control terminal when current through the synchronous rectifier is zero.

25. Method of any one of examples 17 to 24, wherein the SMPS is a flyback converter operable in discontinuous current mode.

What is claimed is:

1. A controller for a use with a power converter, comprising:
   a sensor coupled to sense a signal on a secondary side of the power converter, wherein the sensor is coupled to detect a turn off of a power switch on a primary side of the power converter, wherein the sensor comprises a comparator to compare a current or voltage on the secondary side to a turn off reference value;
   a charge source coupled to charge a control terminal of a synchronous rectifier on the secondary side of the power converter in response to said detection of the turn off of the power switch to allow the synchronous rectifier to conduct a current of a secondary winding; and
   a linear amplifier having an output coupled to sink current from the control terminal of the synchronous rectifier in response to a difference between a voltage across the synchronous rectifier and an amplifier reference value.

2. The controller of claim 1, wherein the linear amplifier is coupled to inhibit discharge of the control terminal until the voltage across the synchronous rectifier reaches the amplifier reference value.

3. The controller of claim 1, wherein the linear amplifier is coupled to have high output impedance when the voltage across the synchronous rectifier is below the amplifier reference value.

4. The controller of claim 1, wherein the linear amplifier is coupled to discharge the control terminal to the threshold voltage of the synchronous rectifier when the voltage across the synchronous rectifier differs from the amplifier reference value.

5. The controller of claim 4, wherein the power converter is a switched mode power supply (SMPS).

6. The controller of claim 5, wherein, the SMPS includes a power input, a switch, a transformer, an output capacitor and a power output, wherein the transformer includes a primary winding on a primary side of said SMPS coupled to said power input and the switch, and a secondary winding on a secondary side of said SMPS coupled to the power output and the output capacitor, wherein the switch is coupled to switch power to said primary winding responsive to a drive signal, wherein the SMPS further includes sense circuitry on the primary side to sense a voltage on the secondary winding, wherein the SMPS further includes a primary side sensing controller to control said drive signal according to at least the sensed voltage, the synchronous rectifier for blocking current flow from the output capacitor to the secondary winding.

7. The controller of claim 6, wherein said voltage across the synchronous rectifier is a voltage across a controllable conduction path for current of the secondary winding, the linear amplifier thereby configured to inhibit discharge of the control terminal until the voltage across the synchronous rectifier reaches the amplifier reference value.

8. The controller of claim 1, wherein the charge source comprises a monostable circuit.

9. The controller of claim 8, wherein the monostable circuit is coupled to charge the control terminal to allow the synchronous rectifier to conduct the current of the secondary winding.

10. The controller of claim 1, wherein the linear amplifier comprises a trans-conductance amplifier.

11. The controller of claim 1, wherein the linear amplifier is coupled to have low output impedance when current through the synchronous rectifier is zero.

12. The controller of claim 1, further comprising:
   a comparator coupled to compare the voltage across the synchronous rectifier to a reference voltage; and
   a switch to couple the reference voltage to the control terminal when current through the synchronous rectifier is zero.

13. The controller of claim 1, wherein the synchronous rectifier comprises a field effect device.

14. The controller of claim 1, wherein a magnitude of the amplifier reference value is less than or equal to a magnitude of a forward voltage drop of a body diode of the synchronous rectifier, wherein the magnitude of the amplifier reference value is within a range of 0.3V to 0.4V.

15. The controller of claim 1, wherein a magnitude of the turn off reference value is greater than zero, within a range of 0.04V to 0.06V.

16. A power converter comprising:
   a transformer having a primary winding on a primary side of the power converter, and a secondary winding on a secondary side of the power converter, wherein the primary winding is coupled to a power input of the power converter, and wherein the secondary winding is coupled to a power output of the power converter;
   a power switch coupled to the primary winding and the input of the power converter to switch power to the primary winding in response to a drive signal;
   an output capacitor coupled to the secondary winding and the output of the power converter;
   sense circuitry on the primary side of the power converter coupled to sense a voltage on the secondary winding on the secondary side of the power converter;
   a primary side sensing controller coupled to control said drive signal in response to at least the sensed voltage;
   a synchronous rectifier on the secondary side of the power converter coupled to block current flow from the output capacitor to the secondary winding; and
   a synchronous rectifier controller on the secondary side of the power converter coupled to control the synchronous rectifier, the synchronous rectifier controller comprising:
      a sensor coupled to sense a signal on the secondary side of the power converter, wherein the sensor is coupled to detect a turn off of the power switch on the primary side of the power converter;
      a charge source coupled to charge a control terminal of the synchronous rectifier on the secondary side of the power converter in response to said detection of the turn off of the power switch to allow the synchronous rectifier to conduct a current of the secondary winding;
      a linear amplifier having an output coupled to sink current from the control terminal of the synchronous rectifier in response to a difference between a voltage across the synchronous rectifier and an amplifier reference value;
      a comparator coupled to compare the voltage across the synchronous rectifier to a reference voltage; and
      a switch to couple the reference voltage to the control terminal when current through the synchronous rectifier is zero.

17. The power converter of claim 16, wherein the linear amplifier is coupled to inhibit discharge of the control terminal until the voltage across the synchronous rectifier reaches the amplifier reference value.

18. The power converter of claim 16, wherein the linear amplifier is coupled to have high output impedance when the voltage across the synchronous rectifier is below the amplifier reference value.

19. The power converter of claim 16, wherein the linear amplifier is coupled to discharge the control terminal to the threshold voltage of the synchronous rectifier when the voltage across the synchronous rectifier differs from the amplifier reference value.

20. The power converter of claim 16, wherein the charge source comprises a monostable circuit.

21. The power converter of claim 20, wherein the monostable circuit is coupled to charge the control terminal of the synchronous rectifier to allow the synchronous rectifier to conduct a current of the secondary winding.

22. The power converter of claim 16, wherein the linear amplifier comprises a transconductance amplifier.

23. The power converter of claim 16, wherein the linear amplifier is coupled to have low output impedance when current through the synchronous rectifier is zero.

24. The power converter of claim 16, wherein the synchronous rectifier comprises a field effect device.

25. The power converter of claim 16, wherein the power converter is a flyback converter operable in discontinuous current mode.

26. A method for controlling a synchronous rectifier of a power converter, the power converter having a power input, a switch, a transformer, an output capacitor and a power output, said transformer having a primary winding on a primary side of said power converter coupled to said power input and said switch, and a secondary winding on a secondary side of said power converter coupled to said power output and said output capacitor, said switch to switch power to said primary winding responsive to a drive signal, the power converter further comprising sense circuitry on the primary side to sense a voltage on the secondary winding, the power converter having a primary side sensing controller to control said drive signal according to at least the sensed voltage, the synchronous rectifier for blocking current flow from the output capacitor to the secondary winding, the method comprising:

detecting turn off of the switch;

supplying charge to a control terminal of the synchronous rectifier in response to said detecting to charge the control terminal of the synchronous rectifier-to allow the synchronous rectifier to conduct current of the secondary winding;

allowing the control terminal to remain charged during a time interval following the charge supplying, while allowing current in said secondary winding to decline;

detecting when voltage across the synchronous rectifier reaches an amplifier reference value to trigger discharge of the control terminal to the threshold voltage, said voltage across the synchronous rectifier being a voltage across a controllable conduction path for current of the secondary winding;

coupling the control terminal to a reference voltage to further discharge the control terminal, wherein said discharge of the control terminal to the threshold voltage comprises controlling current to the control terminal such that the voltage across the synchronous rectifier approaches the amplifier reference value; and configuring a linear amplifier to have high output impedance when the voltage across the synchronous rectifier is below the amplifier reference value, said high output impedance to inhibit discharge of the control terminal, wherein the linear amplifier has an output to sink current from the control terminal dependent on the difference between the voltage across the synchronous rectifier and the amplifier reference value.

27. The method of claim 26, wherein said detecting turn off of the switch comprises comparing the voltage across the synchronous rectifier to a turn off reference value.

28. The method of claim 26, wherein said supplying charge comprises triggering a monostable circuit to cause delivery of a charge pulse to the control terminal.

29. The method of claim 26, wherein the synchronous rectifier comprises a field effect device, and the charging the control terminal causes transfer of secondary winding current from a body diode of the field effect device to a channel of the field effect device.

30. The method of claim 26, wherein the allowing the control terminal to remain charged is performed by allowing the control terminal to float.

31. The method of claim 26, further comprising comparing the voltage across the synchronous rectifier to the reference voltage and controlling a switch to apply the reference voltage to the control terminal when current through the synchronous rectifier is zero.

32. The method of claim 26, wherein the power converter is a flyback converter operable in discontinuous current mode.

33. The method of claim 26, wherein the power converter is a switched mode power supply (SMPS).

* * * * *